(12) United States Patent
Shaw et al.

(10) Patent No.: US 6,419,372 B1
(45) Date of Patent: Jul. 16, 2002

(54) COMPACT OPTICAL WAVE-GUIDE SYSTEM FOR LED BACKLIGHTING LIQUID CRYSTAL DISPLAYS

(75) Inventors: James E. Shaw, Ely; Donald E. Mosier, Cedar Rapids, both of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 87 days.

(21) Appl. No.: 09/657,693

(22) Filed: Sep. 8, 2000

(51) Int. Cl.[7] .......................... F21V 9/16; G02F 1/1335
(52) U.S. Cl. .................. 362/231; 362/31; 362/555; 362/561; 362/583; 349/62; 349/68
(58) Field of Search .................. 349/61–69; 362/26, 362/27, 29–31, 555, 561, 800, 230, 231, 583

(56) References Cited

U.S. PATENT DOCUMENTS

| | | | |
|---|---|---|---|
| 4,573,766 A | 3/1986 | Bournay, Jr. et al. | 349/65 |
| 4,630,895 A | 12/1986 | Abdala, Jr. et al. | 349/65 |
| 4,655,553 A | 4/1987 | Klein | 349/61 |
| 4,722,028 A | 1/1988 | Brannon et al. | 362/29 |
| 4,887,189 A | 12/1989 | Garrett | 362/23 |
| 4,915,478 A * | 4/1990 | Lenko et al. | 349/65 |
| 5,143,433 A | 9/1992 | Farrell | 362/29 |
| 5,150,257 A * | 9/1992 | Mohabbatizadeh et al. | 362/29 |
| 5,211,463 A | 5/1993 | Kalmanash | 362/26 |
| 5,479,275 A * | 12/1995 | Abileah | 349/62 |
| 5,661,578 A | 8/1997 | Habing et al. | 349/65 |
| 5,886,681 A | 3/1999 | Walsh et al. | 345/102 |
| 5,982,090 A * | 11/1999 | Kalmanash | 362/31 |
| 6,268,702 B1 * | 7/2001 | Fleck | 362/231 |

* cited by examiner

*Primary Examiner*—Alan Cariaso
(74) *Attorney, Agent, or Firm*—Nathan O. Jensen; Kyle Eppele

(57) ABSTRACT

Disclosed are a flat panel display and a backlight which provides both night vision and day mode backlighting of the flat panel display. The backlight of the flat panel display includes a circuit card and day mode light emitting diodes (LEDs) positioned coplanar with each other on the circuit card. Night vision (NVIS) LEDs are positioned on the circuit card coplanar with the day mode LEDs. An optical wave-guide is positioned in front of the day mode LEDs and the NVIS LEDs and is adapted to distribute light from the day mode LEDs and from the NVIS LEDs forward away from the LEDs and the circuit card.

18 Claims, 5 Drawing Sheets

COMPACT OPTICAL WAVE-GUIDE SYSTEM FOR LED BACKLIGHTING LIQUID CRYSTAL DISPLAYS

FIELD OF THE INVENTION

The present invention relates to flat panel displays. More particularly, the present invention relates to systems for backlighting flat panel displays.

BACKGROUND OF THE INVENTION

The principle of operation of flat panel displays is well known in the art. However, for purposes of understanding the present invention, it can be stated that flat panel displays, such as liquid crystal displays (LCDs), operate by modulating the transmissibility of light through a matrix of pixel elements when an electric field is applied. Since the effect is localized to selected pixel elements, shapes and characters can be drawn by carefully controlling the application of the electric field. Unlike cathode ray tubes (CRTs), non-emissive flat panel displays are not self-illuminating. Therefore, some sort of backlighting of the flat panel display pixel matrix is typically required in order for the flat panel display to be viewed.

Edge lighting of avionics flat panel displays for dual mode night vision (NVIS) or primary lighting is well known in the art. Traditional applications of the technology have required significant complexity in geometry, space, and cost in order to be effective. Traditional dual mode approaches to lighting avionics flat panel displays have combined fluorescent lamps and light emitting diodes (LEDs), or filtered fluorescent and fluorescent lamps, in order to meet NVIS radiance limits. This conventional approach consumes a substantial amount of packing space and makes flat panel displays anything but flat. The depth required to edge light for NVIS modes of operation adds considerable depth to the flat panel display. Additionally, the circuit card requirements for driving both light sources positioned directly behind the flat panel display pixel matrix (for day mode operations) and light sources positioned behind and to the sides of the flat panel display pixel matrix (for NVIS mode operations) adds considerable cost to the display manufacturing process.

Consequently, an improved dual mode backlight for flat panel displays which overcomes these and other problems would be a significant improvement in the art.

SUMMARY OF THE INVENTION

Disclosed are a flat panel display and a backlight which provides both night vision and day mode backlighting of the flat panel display. The backlight of the flat panel display includes a circuit card and day mode light emitting diodes (LEDs) positioned coplanar with each other on the circuit card. Night vision (NVIS) LEDs are positioned on the circuit card coplanar with the day mode LEDs. An optical wave-guide is positioned in front of the day mode LEDs and the NVIS LEDs and is adapted to distribute light from the day mode LEDs and from the NVIS LEDs forward away from the LEDs and the circuit card.

DETAILED DESCRIPTION OF AN ILLUSTRATIVE EMBODIMENT

Figure 1:
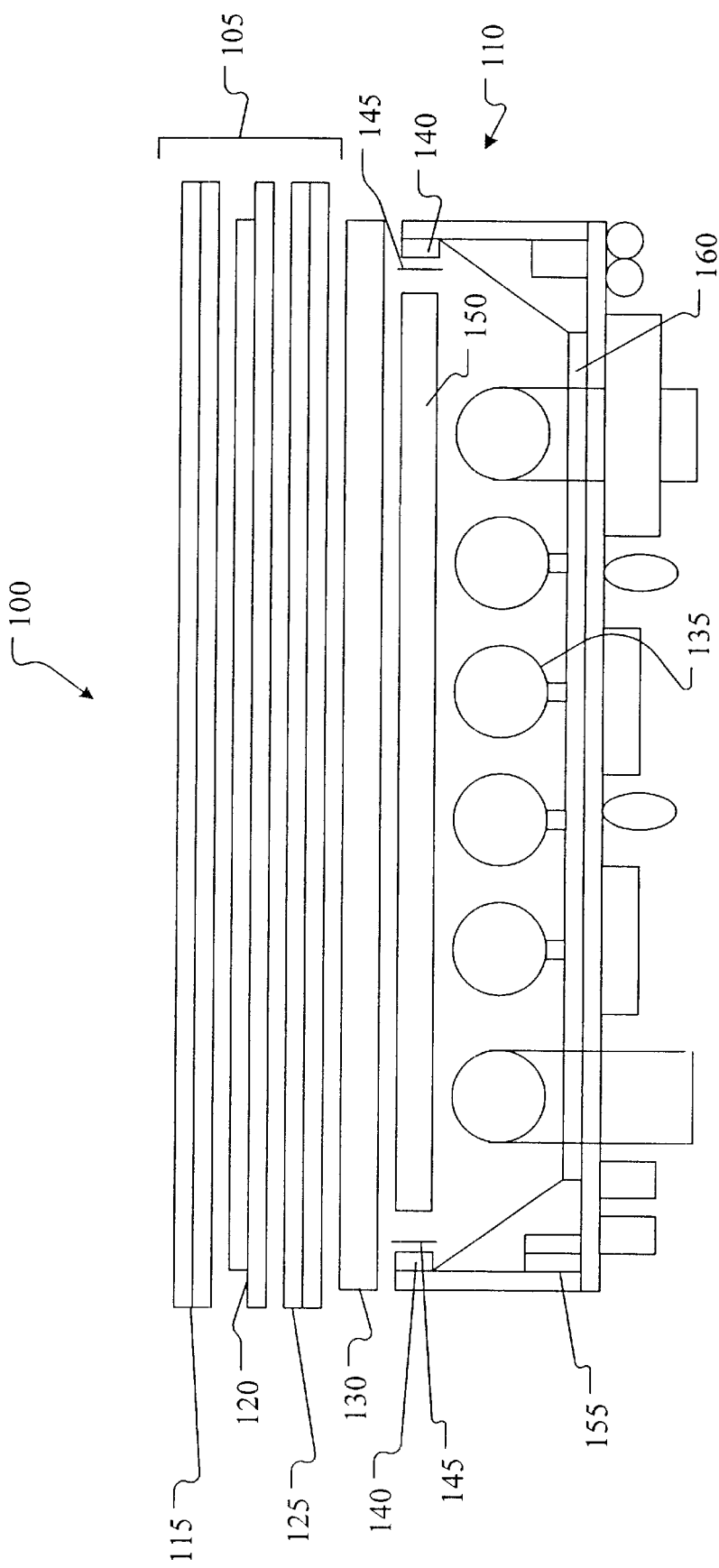
FIG. 1 is a diagrammatic top sectional view illustrating a prior art flat panel display.

FIG. 1 is a diagrammatic top sectional view illustrating prior art flat panel display 100. Flat panel display 100 includes optical stack 105 and backlight 110. Optical stack 105 can include any of a variety of different optical components of the types known in the art such as non-emissive display matrixes, polarizers, compensators, brightness enhancing films, to name but a few. In a typical embodiment, optical stack 105 will include at least polarizers 115 and 125 and display matrix 120. Optical stack 105 can also include diffuser 130, but in the illustrated embodiment diffuser 130 is shown separately from optical stack 105. Diffuser 130 can also be considered to be part of backlight 110.

Backlight 110 includes fluorescent lamps 135 positioned directly behind substantially the entire (including middle portions) stack 105 for backlighting flat panel display 100 during primary mode operations. Light emitting diodes (LEDs) 140 are positioned forward of fluorescent lamps 135 and generally behind optical stack 105, but at edges of flat panel display 100. The LEDs 140 function with NVIS filters 145 to direct light, having only NVIS compatible frequencies, toward optical wedge 150. Optical wedge 150 is designed to distribute and redirect light from LEDs 140 forward through diffuser 130 and optical stack 105 during NVIS modes of operation.

A connector 155 is used to electrically and physically couple LEDs 140 to controlling circuitry on circuit card 160. Circuit card 160 is used to drive both fluorescent lamps 135 and NVIS LEDs 140 during the dual modes of operation. The complicated hardware requirements which are necessary to both drive the fluorescent lamps 135 positioned directly behind optical stack 105 and to drive LEDs 140 positioned forward and to the sides (relative to the fluorescent lamps) increases the cost, complexity, space requirements and weight of flat panel display 100.

Figure 2A:
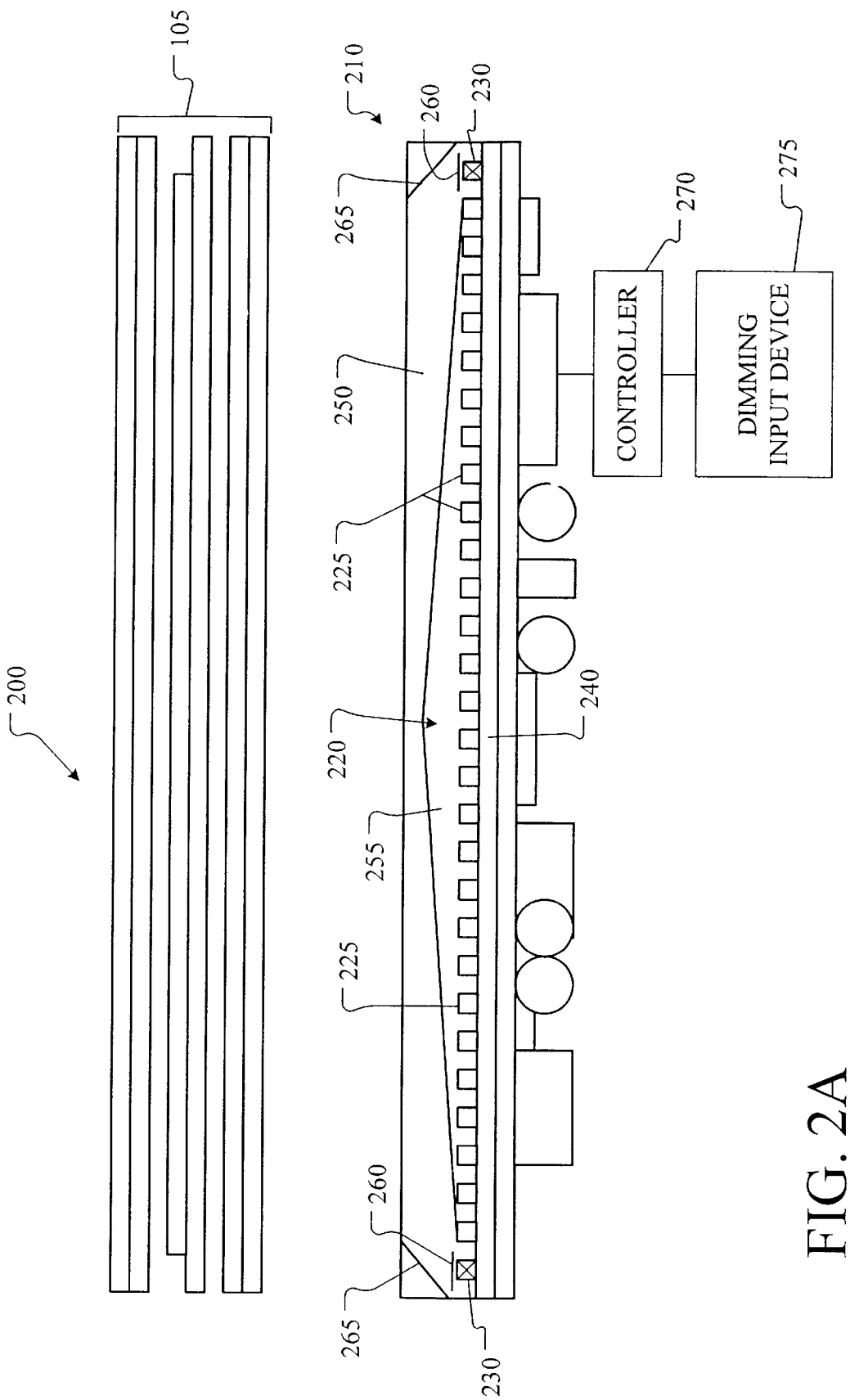
FIG. 2A is a diagrammatic top sectional view illustrating a flat panel display incorporating a compact optical wave-guide backlight in accordance with a first embodiment of the invention.
Figure 2B:
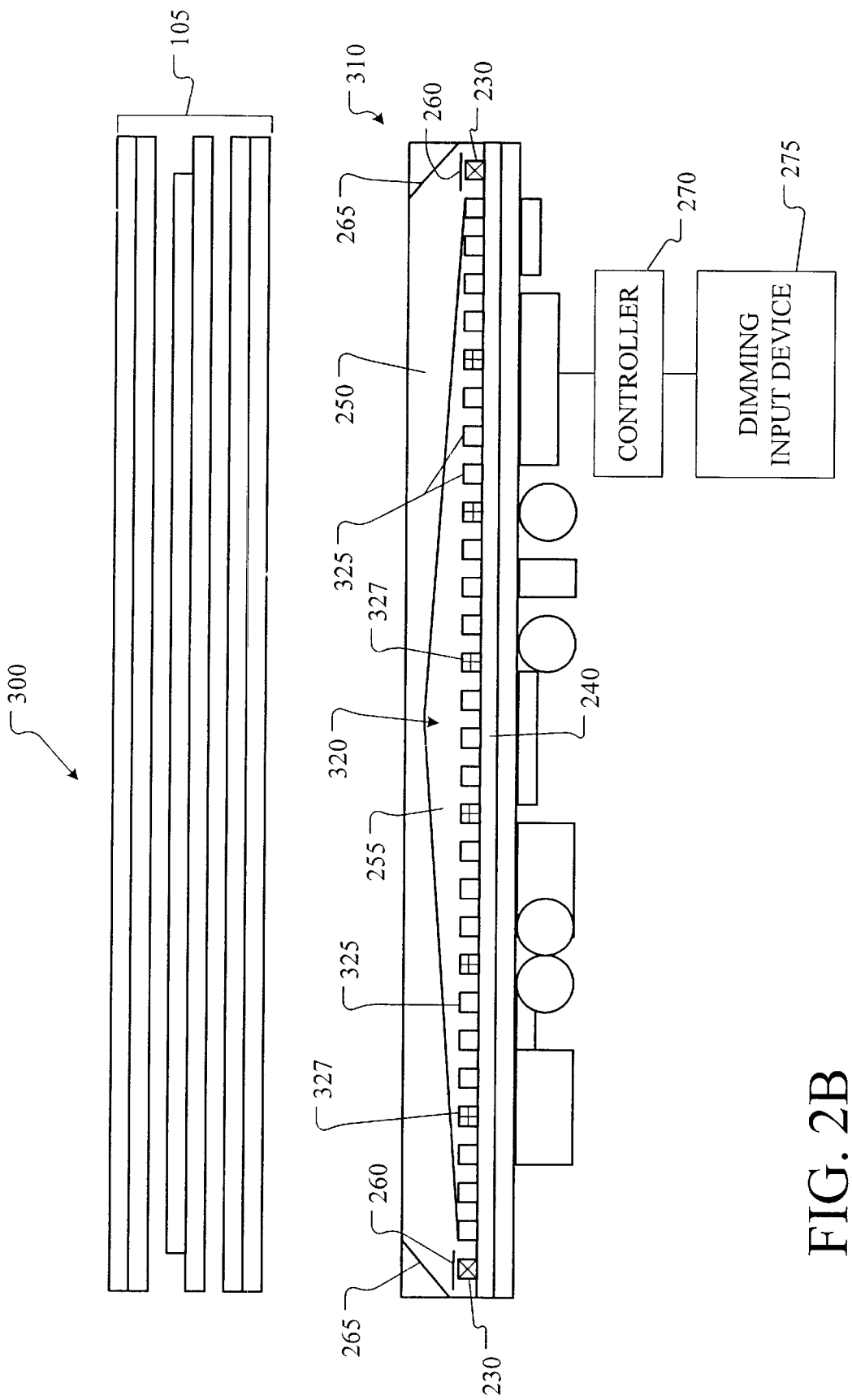
FIG. 2B is a diagrammatic top sectional view illustrating a flat panel display incorporating a compact optical wave-guide backlight in accordance with a second embodiment of the invention.

FIG. 2A is a diagrammatic top sectional view illustrating flat panel display 200 in accordance with a first embodiment of the present invention. Flat panel display 200 includes optical stack 105 and backlight 210. Separation between backlight 210 and optical stack 105 is exaggerated in FIGS. 2A–2D for the sake of clarity. Backlight 210 includes array 220 of LEDs. Array 220 includes primary mode LEDs 225 and NVIS LEDs 230 mounted coplanar to the same circuit card 240. Although NVIS LEDs 230 are mounted co-planar with primary mode LEDs 225, in this particular embodiment NVIS LEDs 230 are mounted on the edges of backlight 210, while primary mode LEDs 225 are mounted across substantially the entire middle portion of backlight 210. As is known in the art, LEDs 225 provide numerous advantages over fluorescent lamps including less complex drive circuitry requirements, better degradation properties, increased dimming range and smaller space requirements. Further, use of solid state LEDs allows this portion of backlight 210 to be fabricated using existing fabrication processes.

Backlight 210 also includes wave-guide 250 positioned directly in front of array 220 of LEDs and optionally mounted to and supported by the same structure which supports the array 220. Between center portions of optical wave-guide 250 and LED array 220 is optical coupling medium 255, such as air. Optical wave-guide 250 both acts as a diffuser for evenly distributing light from primary mode LEDs 225, and as an NVIS mode light wedge for distributing light from NVIS LEDs 230 at the edges of wave-guide 250. In this manner, the benefits of edge-lighting are realized while at the same time enjoying the benefits of reduced space and complexity associated with having the day-mode LEDs 225 and the NVIS mode LEDs 230 mounted co-planar with each other.

In some embodiments, to facilitate NVIS modes of operation, optical wave-guide 250 includes NVIS filters 260 positioned in front of night mode LEDs 230. These NVIS filters filter out non-NVIS compatible frequencies of light in a manner which is the same or similar to NVIS filters in the prior art. NVIS filters 260 are optional and are unnecessary if NVIS LEDs 230 are adapted to emit only the desired light frequencies. However, if NVIS LEDs 230 are of the same type as primary mode LEDs 225, then filters 260 will typically be necessary. Further, since this design utilizes co-planar edge lighting, NVIS reflectors 265 can be embedded within optical wave-guide 250 to redirect light from NVIS LEDs 230 toward the center of the optical wave-guide for uniform NVIS mode backlighting. Reflectors 265 can comprise reflective coatings of the type which are adapted to reflect only certain frequencies of light, while absorbing others. Also, reflectors 265 can be beveled edges of optical wave-guide 250 which are highly polished.

In accordance with the present invention, backlight 210 provides numerous advantages over prior art dual mode backlights. As mentioned above, the co-planar mounting of both primary mode LEDs and NVIS LEDs to the same circuit card eliminates complicated hardware requirements for connectors or flexible circuits, and further simplifies the drive requirements of the backlight system. Wave-guide 250 provides uniform distribution of NVIS compatible lamp luminance across the display, while isolating NVIS lighting from normal lighting (dual mode). Wave-guide 250 is passive to normal LED luminance and provides diffuse scattering for uniformity, thus illuminating the diffuser and the depth associated with the diffuser through material selection and surface preparation.

The backlights and flat panel displays of the present invention as illustrated in FIGS. 2A–2D improve dimming performance by enabling seamless transition between day and night modes of operation. Controller 270 is coupled to circuit card 240 and controls the luminance output of both the NVIS LEDs 230 and the primary mode LEDs 225. In an avionics application, a pilot will frequently fly the aircraft at night with the controller 270 controlling primary mode LEDs 225 to backlight at a low luminance level. When the pilot wishes to operate the flat panel display in a NVIS mode, he/she puts on NVIS goggles and adjusts (lowers) the luminance using a dial or other dimming input device 275. As the pilot adjusts the luminance using dimming input device 275, software within controller 270 brings down the luminance of primary or day mode LEDs 225, and increases the luminance of NVIS LEDs 230. Thus, the various flat panel display embodiments of the present invention provide seamless transition between day and night modes of operation. This function is especially useful in retrofit applications which do not have master lighting bus controls with NVIS settings.

Backlight 210 of flat panel display 200 illustrated in FIG. 2A, as well as other backlight embodiments of the present invention, is adapted to provide sufficient light extraction techniques and light mixing techniques to uniformly illuminate the flat panel display matrix with achromatic energy. The light extraction and light mixing techniques are implemented within wave-guide 250. Also, waveguide lighting can be used to balance chromatic deficiencies of primary lighting. For instance, waveguides lighting can be used to improve color space of white LEDs through the addition of red LEDs. As is known in the art, LEDs frequently have limitations in that commercial grade white LEDs may not be the color of "white" that is desired for an avionics or other specific application. Often times, commercial grade white LEDs are deficient in the color red. To overcome such deficiencies, a flat panel display such as display 300 shown in FIG. 2B can be used.

Flat panel display 300 includes backlight 310 which is very similar to backlight 210 shown in FIG. 2A. However, backlight 310 differs from backlight 210 in that the primary mode LEDs of array 320 include both primary mode white LEDs 325 and primary mode red LEDs 327. The primary mode red LEDs 327 (designated in FIG. 2B with a "+" symbol) are spread out amongst the primary mode white LEDs 325 to correct for the color deficiency. Wave-guide 250 then mixes\blends the light from LEDS 325 and 327 to provide the desired primary mode color to optical stack 105. While the embodiment illustrated in FIG. 2B utilizes red LEDs 327 and white LEDs 325, any combination of primary mode LED colors can be used to achieve a desired result.

The backlights of the various embodiments of the present invention redirect light into a waveguide for lighting in an NVIS compatible mode, thereby eliminating the need for multiple mechanical parts and electrical connections as used in the prior art. Wave-guide reflectors 265 can be integrated into wave-guide 250, and dichroic coatings can be deposited directly to angled or beveled sides to eliminate the need for NVIS filters 260, or to provide such filtering in an alternate method (band-rejection versus band-pass, for example). Other benefits of the backlights and flat panel displays of the present invention include the reduction of space required to create a dual-mode approach to avionics lighting, and a reduction in the costs of the flat panel display through the consolidation of parts and functions (i.e., diffuser, wave-guide, frame, etc.).

Figure 2C:
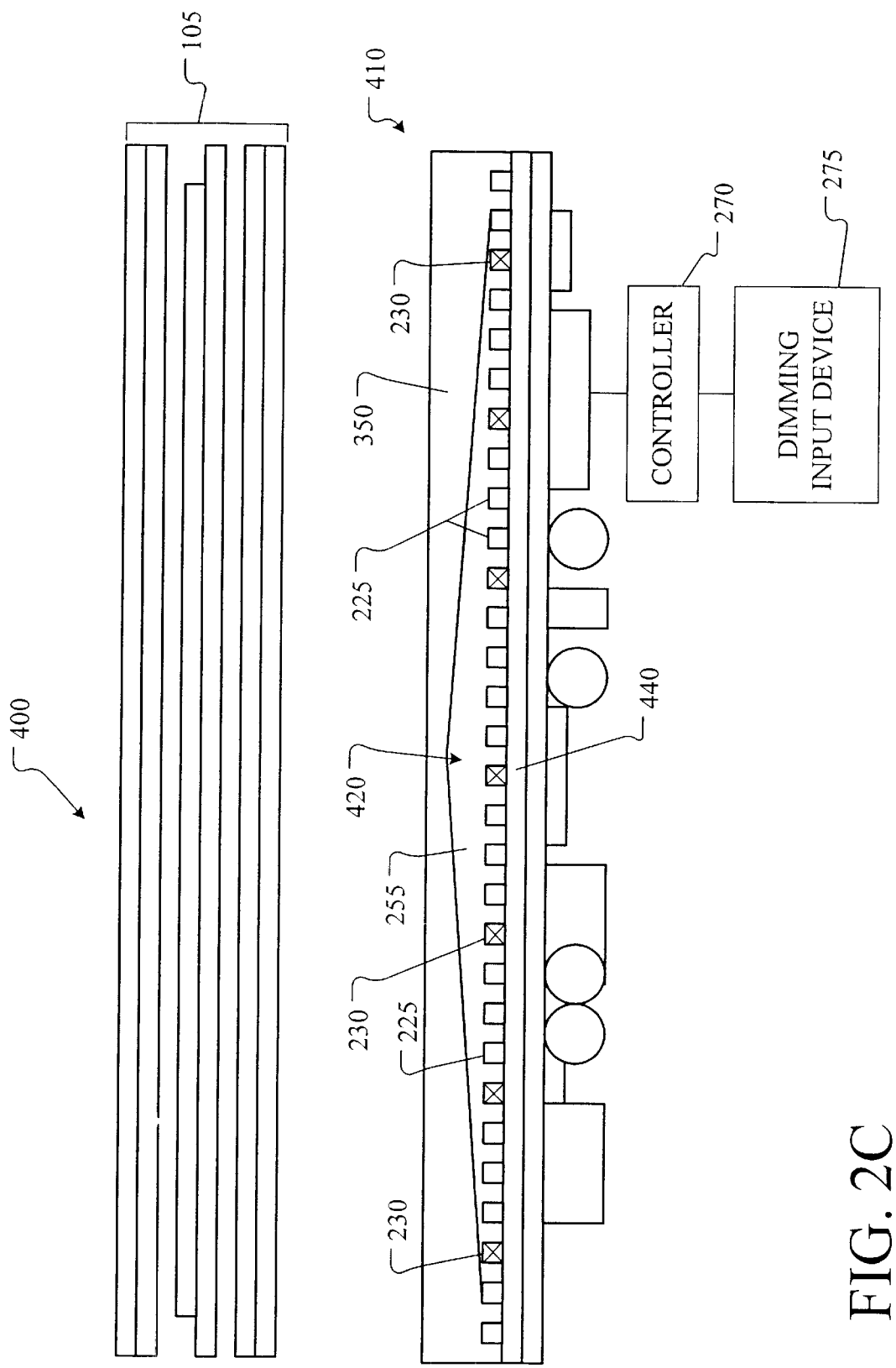
FIG. 2C is a diagrammatic top sectional view illustrating a flat panel display incorporating a compact optical wave-guide backlight in accordance with a third embodiment of the invention.

FIG. 2C illustrates yet another embodiment of a flat panel display in accordance with the present invention. Flat panel display 400 is similar to flat panel displays 200 and 300, but includes backlight 410 having slightly different features, particularly in array 420. Backlight 410 is similar to backlights 210 and 310, except that instead of NVIS LEDs 230 being located only at the edges of the display, they are scattered across the backlight in between primary mode LEDs 225. The advantage of this embodiment is that some of the design requirements of the wave-guide 350 can be simplified or possibly eliminated since the redirection of NVIS light from LEDs 230 toward the center of the display is no longer required. For example, reflectors 265 could potentially be eliminated. The embodiment illustrated in FIG. 2C assumes that NVIS LEDs 230 only generate light in the desired NVIS frequency ranges, and do not need further filtering. Thus, NVIS filters 260 and any necessary diffusers are omitted, or integrated into LEDs 230, in this embodiment. The design requirements of circuit card 440 differ from circuit card 240 (FIGS. 2A and 2B) since NVIS LEDs are included between day mode LEDs 225.

Figure 2D:
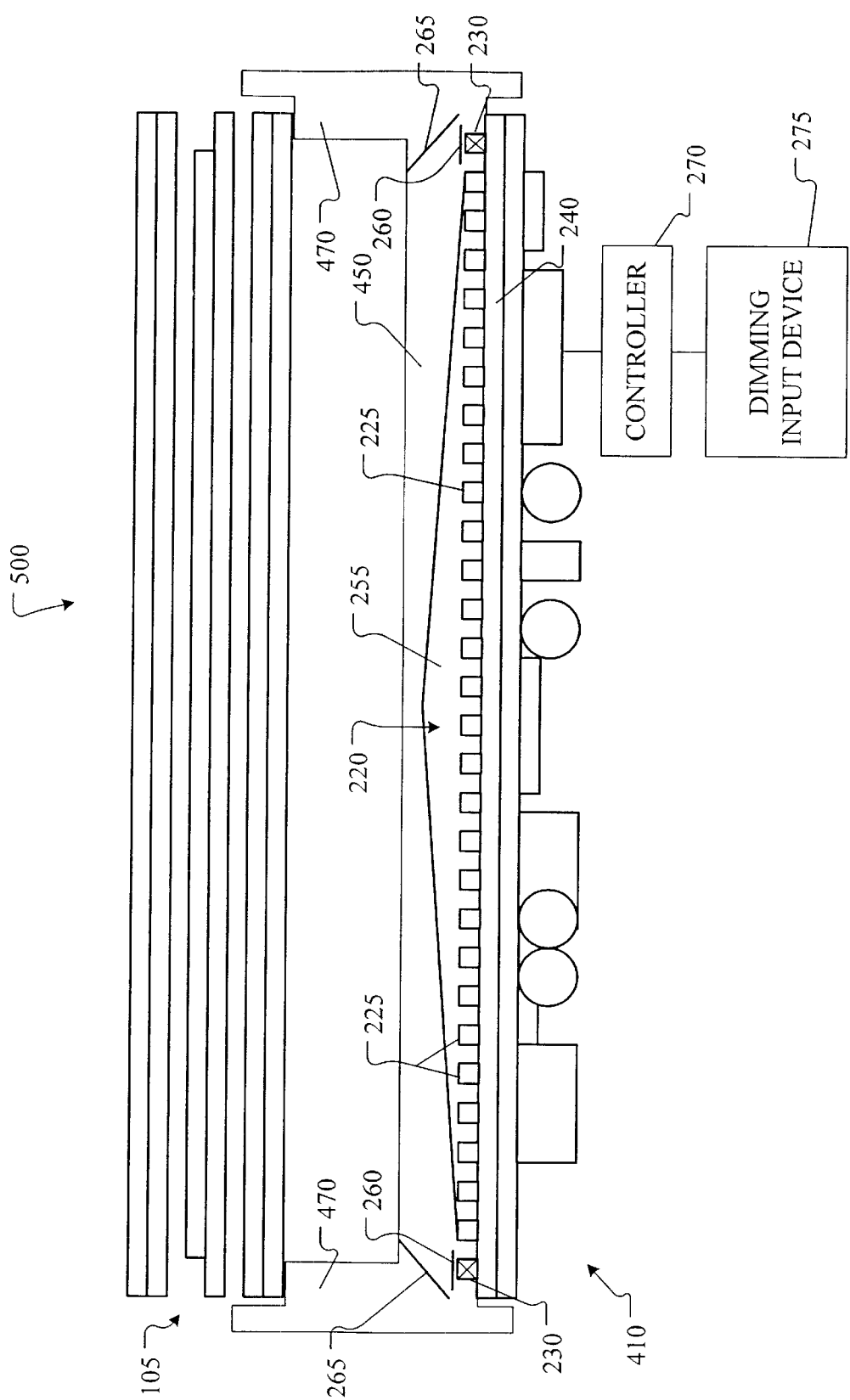
FIG. 2D is a diagrammatic top sectional view illustrating a flat panel display incorporating a compact optical wave-guide backlight in accordance with a fourth embodiment of the invention.

FIG. 2D illustrates flat panel display 500 in accordance with yet another embodiment of the present invention. Flat panel display 500 shown in FIG. 2D is similar to the other embodiments shown in FIGS. 2A–2C, but includes an additional feature in that backlight 410 includes wave-guide 450 having forward extending arms 470 which are adapted to support optical stack 105, thus potentially eliminating other mechanical interface components and thereby reducing costs and/or saving additional space. As is the case with each of the embodiments of the present invention, the spacing between optical stack 105 and array 220 of LEDs is exaggerated in FIG. 2D for ease of illustration. A significant advantage of the flat panel displays of the present invention is that the spacing between optical stack 105 and the sources of light can be reduced, thereby providing space savings for the flat panel display.

Although the present invention has been described with reference to illustrative embodiments, workers skilled in the art will recognize that changes may be made in form and detail without departing from the spirit and scope of the invention.

What is claimed is:

1. A backlight adapted for use in illuminating a flat panel display, the backlight comprising:
    a circuit card;
    a plurality of day mode light emitting diodes (LEDs) positioned coplanar with each other and coupled to the circuit card which powers the plurality of day mode LEDs during day mode operation of the backlight;
    night vision (NVIS) LEDs positioned coplanar with the plurality of day mode LEDs and coupled to the circuit card which powers the NVIS LEDs during night mode operation of the backlight; and
    an optical wave-guide positioned in front of the plurality of day mode LEDs and the NVIS LEDs and adapted to distribute light from the plurality of day mode LEDs and from the NVIS LEDs forward away from the LEDs and the circuit card.

2. The backlight of claim 1, wherein the NVIS LEDs are positioned outside of the plurality of day mode LEDs and are coupled to outer portions of the circuit card.

3. The backlight of claim 2, wherein the optical wave-guide is further adapted to redirect light from the NVIS LEDs toward a center of the wave-guide.

4. The backlight of claim 3, and further comprising NVIS filters positioned on the optical wave-guide, the NVIS filters filtering out non-NVIS frequencies of light generated by the NVIS LEDs.

5. The backlight of claim 3, wherein the optical wave-guide further includes reflective surfaces positioned adjacent the NVIS LEDs which reflect light generated by the NVIS LEDs toward the center of the wave-guide.

6. The backlight of claim 1, wherein the NVIS LEDs are spread across the circuit card such that they are positioned between day mode LEDs.

7. The backlight of claim 1, wherein the plurality of day mode LEDs include LEDs having a first color and LEDs having a second color such that the optical wave-guide mixes the first and second colors.

8. The backlight of claim 7, wherein the first color is a red-deficient white and wherein the second color is red.

9. The backlight of claim 1, wherein the optical wave-guide includes forward extending arms adapted to support an optical stack.

10. A flat panel display comprising:
    an optical stack; and
    a backlight comprising:
        a circuit card;
        a plurality of day mode light emitting diodes (LEDs) positioned coplanar with each other and coupled to the circuit card which powers the plurality of day mode LEDs during day mode operation of the backlight;
        night vision (NVIS) LEDs positioned coplanar with the plurality of day mode LEDs and coupled to the circuit card which powers the NVIS LEDs during night mode operation of the backlight; and
        an optical wave-guide positioned in front of the plurality of day mode LEDs and the NVIS LEDs and adapted to distribute light from the plurality of day mode LEDs and from the NVIS LEDs forward away from the LEDs and the circuit card.

11. The flat panel display of claim 10, wherein the NVIS LEDs are positioned outside of the plurality of day mode LEDs and are coupled to outer portions of the circuit card.

12. The flat panel display of claim 11, wherein the optical wave-guide is further adapted to redirect light from the NVIS LEDs toward a center of the wave-guide.

13. The flat panel display of claim 12, wherein the backlight further comprises NVIS filters positioned on the optical wave-guide, the NVIS filters filtering out non-NVIS frequencies of light generated by the NVIS LEDs.

14. The flat panel display of claim 12, wherein the optical wave-guide further includes reflective surfaces positioned adjacent the NVIS LEDs which reflect light generated by the NVIS LEDs toward the center of the wave-guide.

15. The flat panel display of claim 10, wherein the NVIS LEDs are positioned between day mode LEDs.

16. The flat panel display of claim 10, wherein the plurality of day mode LEDs include LEDs having a first color and LEDs having a second color such that the optical wave-guide mixes the first and second colors.

17. The flat panel display of claim 10, wherein the optical wave-guide includes forward extending arms adapted to support the optical stack.

18. A flat panel display comprising:
    an optical stack including a display matrix; and
    backlight means for providing coplanar night vision (NVIS) backlighting and day mode backlighting of the display matrix.

* * * * *